US012808576B2

(12) United States Patent
Demicheli

(10) Patent No.: US 12,808,576 B2
(45) Date of Patent: Nov. 24, 2026

(54) DYNAMIC MIXER FOR OHMIC HEATING SYSTEM

(71) Applicant: John Bean Technologies S.p.A., Parma (IT)

(72) Inventor: Luigi Demicheli, Pontenure (IT)

(73) Assignee: John Bean Technologies S.p.A., Parma (IT)

( * ) Notice: Subject to any disclaimer, the term of this patent is extended or adjusted under 35 U.S.C. 154(b) by 729 days.

(21) Appl. No.: 18/344,751

(22) Filed: Jun. 29, 2023

(65) Prior Publication Data

US 2025/0003634 A1 Jan. 2, 2025

(51) Int. Cl.
*F24H 1/10* (2022.01)
*A23B 2/00* (2025.01)
(Continued)

(52) U.S. Cl.
CPC ............. *F24H 1/106* (2013.01); *A23B 2/001* (2025.01); *A23B 2/05* (2025.01); *A23B 2/46* (2025.01);
(Continued)

(58) Field of Classification Search
CPC .. A23B 2/001; A23B 2/05; A23B 2/46; B01F 2035/99; B01F 2101/06; B01F 27/11;
(Continued)

(56) References Cited

U.S. PATENT DOCUMENTS 3,574,890 A * 4/1971 Gresch ..................... B01J 19/20 425/379.1
6,678,470 B1 1/2004 Hoshino
(Continued)

FOREIGN PATENT DOCUMENTS

EP 1 886 586 A1 2/2008
IT 2019 0000 6559 A1 11/2020
(Continued)

OTHER PUBLICATIONS

International Search Report and Written Opinion mailed Sep. 19, 2024, issued in corresponding International Application No. PCT/IB2024/056283, filed Jun. 27, 2024, 14 pages.

*Primary Examiner* — Sang Y Paik
(74) *Attorney, Agent, or Firm* — Christensen O'Connor Johnson Kindness PLLC

(57) ABSTRACT

An apparatus for the continuous ohmic thermal treatment of a fluid product includes a conduit defining a longitudinal flow path for the product to be treated extending between an inlet and an outlet. The conduit includes a first and a second heating chamber that are disposed longitudinally along an axis and arranged in sequence, with each heating chamber including a first electrode and a second electrode, separated by an electrical insulating member. The first electrode is located near the inlet or the outlet of the conduit, and the second electrode is located in an intermediate zone of the conduit. A first and a second rotor extend into the first chamber and the second chamber, respectively, and are rotatable about the longitudinal axis. A support system is configured to support in the radial direction the first and second rotors at the intermediate zone of the conduit.

19 Claims, 6 Drawing Sheets

(51) Int. Cl.

| | |
|---|---|
| ***A23B 2/05*** | (2025.01) |
| ***A23B 2/46*** | (2025.01) |
| ***B01F 27/11*** | (2022.01) |
| ***B01F 35/92*** | (2022.01) |
| *B01F 35/90* | (2022.01) |
| *B01F 101/06* | (2022.01) |

(52) U.S. Cl.

CPC .............. *B01F 27/11* (2022.01); *B01F 35/92* (2022.01); *B01F 2035/99* (2022.01); *B01F 2101/06* (2022.01); *F24H 2250/10* (2013.01)

(58) Field of Classification Search

CPC ...... B01F 35/92; F24H 1/106; F24H 2250/10; H05B 2203/021; H05B 3/0009; H05B 3/0023

USPC .......................................................... 392/320

See application file for complete search history.

(56) References Cited

U.S. PATENT DOCUMENTS

| | | | | |
|---|---|---|---|---|
| 8,596,191 | B2 | 12/2013 | Demicheli | |
| 2011/0088569 | A1 | 4/2011 | DeMicheli | |
| 2014/0230810 | A1 * | 8/2014 | Delgado | B01F 27/9211 127/15 |
| 2015/0050400 | A1 * | 2/2015 | Timmermans | A23B 2/05 426/244 |
| 2019/0320500 | A1 * | 10/2019 | Hoshino | A23L 9/12 |
| 2022/0183328 | A1 * | 6/2022 | Rana | A23B 11/127 |
| 2023/0009648 | A1 | 1/2023 | Stute et al. | |

FOREIGN PATENT DOCUMENTS

| | | | |
|---|---|---|---|
| JP | H11 89522 | A | 4/1999 |
| WO | 89/00384 | A1 | 1/1989 |

* cited by examiner

DYNAMIC MIXER FOR OHMIC HEATING SYSTEM

BACKGROUND

The present disclosure relates to apparatuses for thermal treatments of products, in particular foodstuffs. In particular, these are ohmic heating or resistive heating treatments. Ohmic heating treatments are a thermal process whereby heat is generated within the foodstuff. The heat generation is caused by the passage of an electric current generated by a voltage differential through the foodstuff. The ohmic heating treatments can be used to heat, pasteurize, sterilize, or otherwise heat treat food and non-food products.

Ohmic heat treatments are an alternative process to traditional pasteurization methods. Conventional pasteurization processes are based on the transfer of heat to the food or not-food products by convection. In a conventional pasteurization process, the external parts of foodstuffs are exposed more to the heating action than the internal parts. In order to adequately rid the product from pathogens, high temperature heat sources must be used, which could damage the product by causing changes in the chemical, physical, and organoleptic characteristics of the treated foodstuff.

On the other hand, in ohmic heating the heat source is generated from inside the foodstuff, and the heat propagates outwardly. This helps to ensure that all the food particles are thermally treated.

Depending on the result to be achieved and the foodstuff to be treated, ohmic heating involves heating to a specific temperature and maintaining it for an appropriate period of time. The process must ensure that the treatment temperature is homogeneous within the product and maintained for the time necessary within a well-defined temperature range.

Ohmic treatment uses the electrical conductivity of the product to be treated. In particular, it involves passing a certain electrical current through the product, which, by the effect of the electrical resistance of the product, generates heat and consequently raises the temperature product.

Ohmic apparatuses generally involve a continuous operation in which the product to be treated flows inside a conduit in dielectric material, at the ends of which two electrodes are located that have a negative pole, and centrally in the conduit an electrode is located that has a positive pole.

In its flow through the apparatus, the product passes through the first negative pole, then the positive pole, and before exiting it passes through the second negative pole. The potential difference generated by the electrodes may have a value ranging between about 700 and 5100 V and a frequency ranging between about 16 and 25 KHz. This potential difference generates a current which is inversely proportional to the electrical resistance of the product, and which results in the generation of heat.

Ohmic processing temperatures can generally range between about 1° C. and 150° C. The dwelling time of the food product in the ohmic apparatus is a function of the product that is treated and the process temperature.

To help ensure the maximum homogeneity of heating of the product, an ohmic apparatuses may include, within the conduit, a rotor extending along its entire length from the first to the second negative pole. The function of the rotor is to mix the product that is being processed.

In one prior form, the one end of the rotor is supported and mechanically connected to a rotating source, and the opposite end is cantilevered free.

Also, the rotor generally has a plurality of projections along its outer surface that contact the inner surface of the conduit. Also, the projections extend continuously along the length of the rotor so that there are no gaps along the length of the projections. This rotor construction can create the undesired effect of spreading and adhering the product being treated to the inner surface of the conduit.

Therefore, with known rotors, particularly when the product being treated has a high density and/or viscosity, a layer of product can be created on the inner surface of the conduit that advances at a slower rate along the conduit than the advancement rate of the product away from said inner surface. This can result in an undesirable increase in dwelling time and temperature of the product. Furthermore, the laminar motion of the product in the proximity of the walls can cause changes in the electrical resistance of the product that adversely affect the homogeneity of the treatment temperature.

In addition, the fact that the rotor extends along the entire length of the conduit, is cantilever-mounted, and is supported only at the end corresponding to the handling device has the drawback that it may not be possible to reach a high enough rotation speed to achieve the desired mixing effect of the product.

Therefore, prior ohmic systems can pose problems that affect both the efficiency of the treatment of the product, and the reliability of the apparatus over time, and the management of the maintenance of the apparatus. The system of the present disclosure seeks to address these issues.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, an apparatus is provided for the continuous thermal treatment of a fluid product by resistive heating. The apparatus includes a conduit defining a longitudinal flow path for the product to be treated extending between an inlet and an outlet, the conduit comprising at least a first and a second heating chamber that are disposed longitudinally along an axis and arranged in sequence, each heating chamber comprising a first electrode and a second electrode, separated by an electrical insulating member, wherein the first electrode is located near the inlet or the outlet of the conduit, and the second electrode is located in an intermediate zone of the conduit, a first and a second rotor extending into the first chamber and the second chamber, respectively, and rotatable about the longitudinal axis, and a support system configured to support in the radial direction the first and second rotors at the intermediate zone of said conduit.

In any of the embodiments described herein, wherein the support system is configured so that the first and second rotors are radially supported by the fluid product which flows between a first and a second distal end portions of the first and second rotors and the second electrode.

In any of the embodiments described herein, wherein said first and second rotors comprise a central elongated body extending along the longitudinal axis and a plurality of projections extending radially from the central body.

In any of the embodiments described herein, wherein the support system comprises the second electrode shaped as an annular body having an inner surface which the projections face.

In any of the embodiments described herein, wherein the distance separating the projections and the inner surface of the annular body is from between 0.1-0.3 millimeters, through which the fluid product passes.

In any of the embodiments described herein, wherein the projections have a radial height extending from the body that is less than the inner radius of the electrical insulating member of the first and the second chambers so as to leave a space for the passage of the product.

In any of the embodiments described herein, wherein space between the projections and the inner radius of the electrical insulating member is from between 0.5-10 millimeters.

In any of the embodiments described herein, wherein space between the projections and the inner radius of the electrical insulating member is from between 0.5-5 millimeters.

In any of the embodiments described herein, wherein the first electrode is a negative electrode.

In any of the embodiments described herein, wherein the second electrode is a positive electrode.

In any of the embodiments described herein, wherein the second electrode is connected to a square-wave current power source.

In any of the embodiments described herein, wherein the first electrode and the second electrode are subjected to an electric current of a potential difference of at least 700V with a frequency of at least 16 kHz.

In any of the embodiments described herein, wherein the voltage of the electric current applied to the pair of electrodes ranges between 700V and 5100V, and the frequency of the electric current ranges between 16 and 50 KHz.

In any of the embodiments described herein, wherein the first and second rotors are coupled to handling and support devices adapted to rotate the first and second rotors independently of one another.

In any of the embodiments described herein, wherein the handling and support devices comprise a first motor coupled to an initial portion of the first rotor, and a second motor coupled to an initial portion of the second rotor.

In any of the embodiments described herein, wherein the projections of the first and second rotors are spaced apart along the length of the central body.

In any of the embodiments described herein, wherein the projections of the first and second rotors define gaps extending along the length of the central body, the gaps extending around the entire circumference of the central body.

In any of the embodiments described herein, wherein the second electrode is common to the first and the second chambers, wherein, with respect to the direction of flow of the product, the first chamber ends with the second electrode and the second chamber starts with the second electrode.

In any of the embodiments described herein, wherein the second electrode of the first chamber is distinct from the second electrode of the second chamber, and one or more connecting members are interposed between the two second electrodes.

In any of the embodiments described herein, wherein the first and second rotors are composed of dielectric material.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
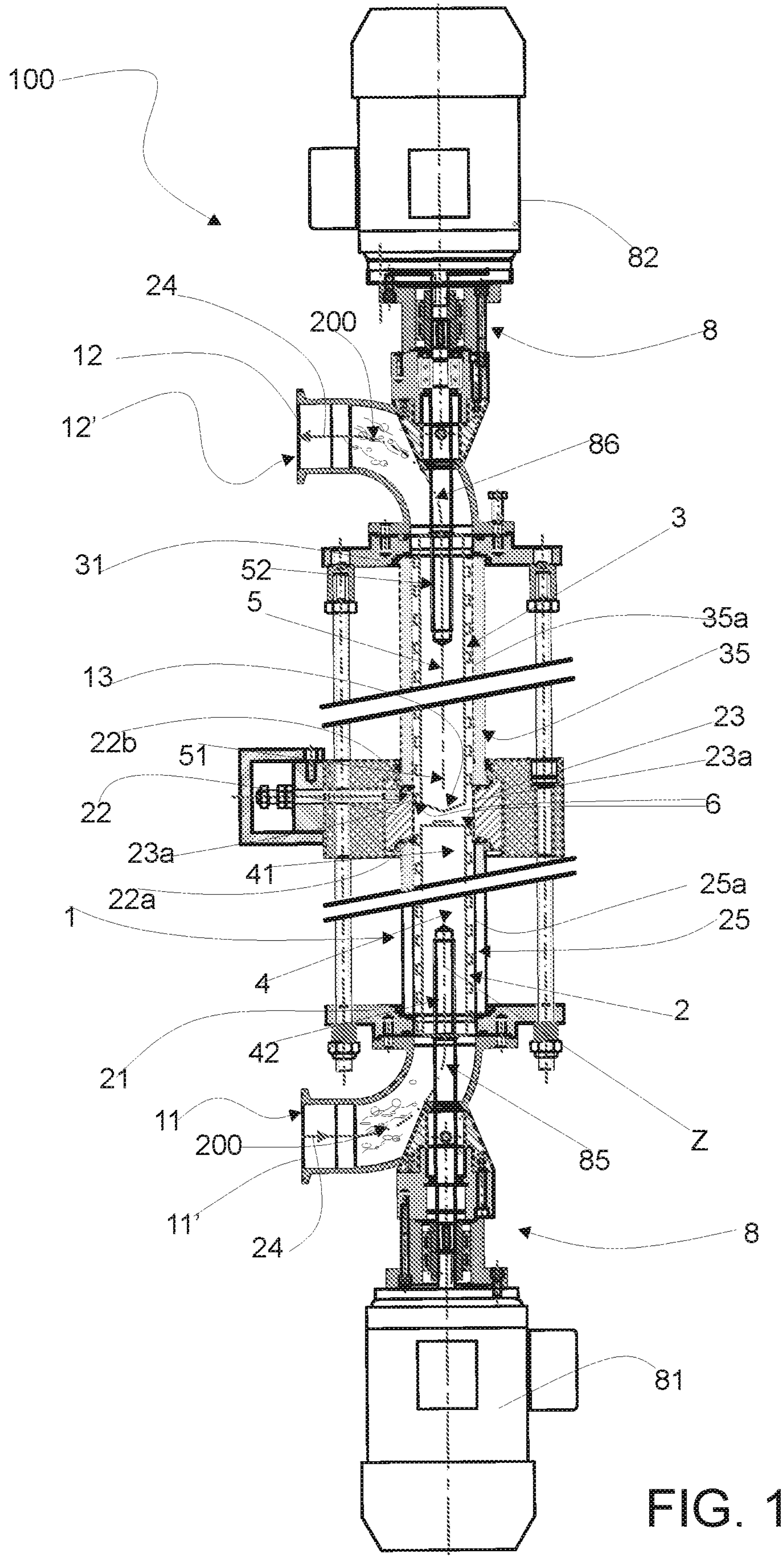
FIG. 1 illustrates a sectional view of an apparatus for the thermal treatment of a fluid product according to a disclosed embodiment.

With particular reference to FIG. 1, an apparatus 100 for the continuous ohmic thermal treatment of a fluid product 200 is illustrated. The apparatus 100 is configured to perform thermal treatment of the product by ohmic resistive heating as explained below.

By the term "fluid product" is meant a product, and in particular a foodstuff, which can be pushed by a pump. It is therefore also understood to mean a product, which may contain solid parts, having dimensions between about 1-4 mm, but included in a preserving liquid.

The apparatus 100 is suitable for handling different types of food, of which the following are some non-exhaustive examples. The foodstuff can be in fluid form, such as fruit or vegetables juices or purées. The products treated by the apparatus 100 can be delicate products, such as liquid eggs, dairy products, e.g., cheese, yogurt, creams, whey-based products.

Very viscous products, such as sauces and creams, can also be treated. Furthermore, meat-based foods and protein-based products can also be treated.

The apparatus 100 can be used to carry out various types of thermal treatments, including: heating, pasteurization, sterilization.

According to an aspect of the invention, the apparatus 100 may include a conduit 1 defining a longitudinal flow path for a fluid product 200 to be treated, between an inlet port 11 and an outlet port 12.

In particular, the conduit 1 may include at least one first and one second heating chamber 2, 3, which extend longitudinally along an axis Z. The first and second chambers 2, 3 are arranged in sequence so that the product 200 flows through the first chamber 2 and then through the second chamber 3. As such, the first and second chambers 2, 3 are arranged in continuity with each other.

The inlet conduit 1 has an inlet port that is in fluid communication with an inlet conduit 11' of the product 200 to be treated. The conduit has an outlet port 12 that is preferably in fluid communication with a discharge conduit 12' of the treated product 200.

Each chamber 2, 3 may include a first electrode 21, 31 and a second electrode 22, 122, 132.

In particular, the first electrode 21 of the first chamber 2 may be located at the inlet port 11 of the conduit 1, while the first electrode 31 of the second chamber 3 may be located at the outlet port 12 of said conduit 1. Further, the second electrode 22, 122, 132 may be located in an intermediate zone 13 of the conduit 1.

Figure 2:
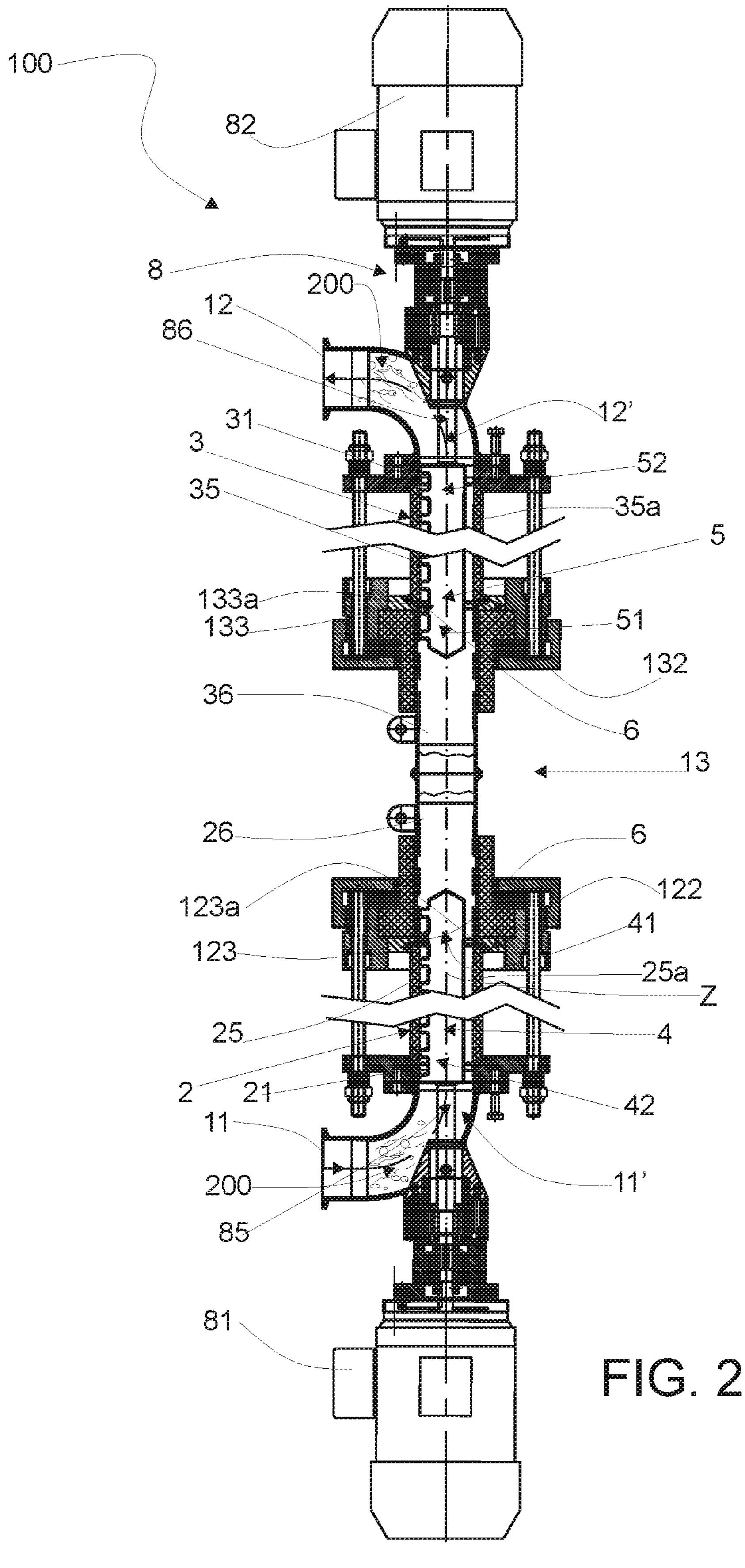
FIG. 2 illustrates a sectional view of an apparatus for the thermal treatment of a fluid product according to another disclosed embodiment.

As illustrated in FIGS. 1 and 2, the first electrode 21, 31 and second electrode 22, 122, 132 are separated by an electrical insulating member 25, 35. The electrical insulating member 25, 35 may be in the form of a tube 25*a*, 35*a*.

As such, the product 200 flows through the first electrode 21, of the first chamber 2, at the inlet port 11, then it passes through the second electrode 22, 122, 132, and subsequently passes through the first electrode 31 of the second chamber 3, located at the outlet port 12.

The first electrode 21, 31 may be a negative electrode. The first negative electrode 21, 31 is generally grounded.

The second electrode 22, 122, 132 may be a positive electrode. The second electrode 22, 122, 132 may be connected to a square-wave current power source.

According to an aspect of the invention, the first electrode 21, 31 and the second electrode 22, 122, 132 may be subjected to a potential difference of at least 700V.

The frequency of the electric current may be at least 16 KHz. The voltage applied between said first electrode 21, 31 and second electrode 22, 122, 132 may range from between 700V and 5100V and the frequency may range from between 16 and 25 KHz.

In this manner, the apparatus 100 provides for an electrical current to pass through the product 200 to be treated. The product 200 acts as an electrical resistor and, as a function of the conductivity of the product 200, the electrical power is converted into heat. The heating duration of the product 200 can be quite short, and will depend at least in part on the velocity of the product 200 flowing through the apparatus 100. For example, the heating duration can be from about 0.05 minutes to about 0.15 minutes In order to avoid undesired electrolytic phenomena on the foodstuff being treated, the first electrode 21, 31 and second electrode 22, 122, 132 are preferably made of stainless steel, in compliance with the current governmental regulations on food contact materials in effect in many countries.

In FIG. 1, an embodiment of the apparatus 100 is shown wherein the second electrode 22 is common to the first and the second chambers 2, 3. Also in FIG. 1, the conduit 1 provides for only a singular second electrode 22, preferably arranged at or near the center of the conduit 1. In this case, the second electrode 22 is a positive electrode. Also in this case, the second electrode 22 includes two faces 22*a*, 22*b*, one of which faces the first chamber 2, and one which faces the second chamber 3.

According to the flow direction of the foodstuff, as shown by arrows 24, the second chamber 3 begins where the first chamber 2 ends. In particular, the first chamber 2 ends with the second electrode 22 and the second chamber 3 begins with the second electrode 22.

An alternative embodiment of the present disclosure is illustrated in FIG. 2. In the embodiment of FIG. 2, a second electrode 122 of the first chamber 2 is distinct from a second electrode 132 of the second chamber 3. Both the second electrode 122 of the first chamber 2 and the second electrode 132 of the second chamber 3 are positive electrodes.

Thus, in FIG. 2, the conduit 1 includes a pair of positive second electrodes 122, 132 which are shown as arranged in an intermediate zone 13 of the apparatus, and may be located in a symmetrical position with respect to the longitudinal center of the conduit 1. In this regard, the first chamber 2 ends with the second electrode 122 and the second chamber 3 begins with the second electrode 132.

In order to provide continuity to the conduit 1, one or more connecting members 26, 36 may be interposed between said second electrodes 122, 132. The connecting members 26, 36 are attached to the electrode annual bodies 123 and 133, respectively. Therefore, one or more tube-shaped connecting members 26, 36 for the passage of the product 200 can be present between the first chamber 2 and the second chamber 3.

The apparatus 100 further includes first and second rotors 4, 5. The rotors 4, 5 are composed of dielectric material. The first rotor 4 extends into the first chamber 2, while the second rotor 5 extends into the second chamber 3.

As discussed below, the first and second rotors 4, 5 are rotatable about the axis Z along which the first and the second chambers 2, 3 extend.

The first and second rotors 4, 5, are composed of a first and a second initial shaft portion 42, 52 and a first and a second agitator end portion 41, 51. By first and second initial shaft portions 42, 52 is meant the one in the proximity of the inlet port 11 and at the first electrode 21 for the first rotor 4, and the one in the proximity of the outlet port 12 and at the second electrode 31 for the second rotor 5.

On the other hand, by first and second agitator end portions 41, 51 is meant the one in the intermediate zone 13, in particular at the second electrode 22, 122, 132. As illustrated in FIGS. 1 and 2, the first agitator end portion 41 of the first rotor 4 is opposite the second agitator end portion 51 of the second rotor 5.

The length of the first and second rotors 4, 5 is such that there is no contact between the first and second agitator end portions 41, 51 of the two rotors 4, 5.

The configuration of the first and second agitator end portions 41, 51 are constructed so as to optimize the desired turbulence of the product 200 flowing through the apparatus 100.

As shown in FIG. 1, the distal agitator end portion 41 of the rotor 4 is configurated in a different manner than the distal agitator end portion 51 of the rotor 5.

For example, the first rotor 4 may comprise a distal end portion 41 shaped as an impeller that pushes the foodstuff away from the distal end portion 41, while the second distal end portion 51 of the second rotor 5 is shaped so as to provide a suction effect that draws and channels the fluid toward the second rotor 5.

The first and second rotors 4, 5 are coupled to handling and support devices 8 adapted to rotate the first and second rotors independently of one another. In this regard, it is possible to control the rotation of the rotors 4, 5 independently of each other so as to adapt to the various types of product 200 being processed.

Preferably, the first and second rotors 4, 5 are removably coupled to the handling and support devices 8 to facilitate their replacement in case of needed maintenance to the rotors or to process different products 200.

According to an example of the present disclosure, the handling and support devices 8 include a first motor 81 mechanically coupled to the shaft portion 42 of the first rotor 4 and a second motor 82 coupled to the shaft portion 52 of the second rotor 5.

Hydraulic sealing members are present between the shaft portions 42 and 52 and the inlet 11 and/or outlet 12 ports of the conduit 1.

The first and second motors 81, 82 can rotate the rotors 4, 5 in the same rotation direction, i.e., as if they were a single rotor. Alternatively, said first and second motors 81, 82 can rotate the rotors 4, 5 in an opposite rotation direction, for example, to create more turbulence inside the conduit 1. As a result, it is possible to apply the most suitable operation to the type of product 200 to be treated.

Figure 3:
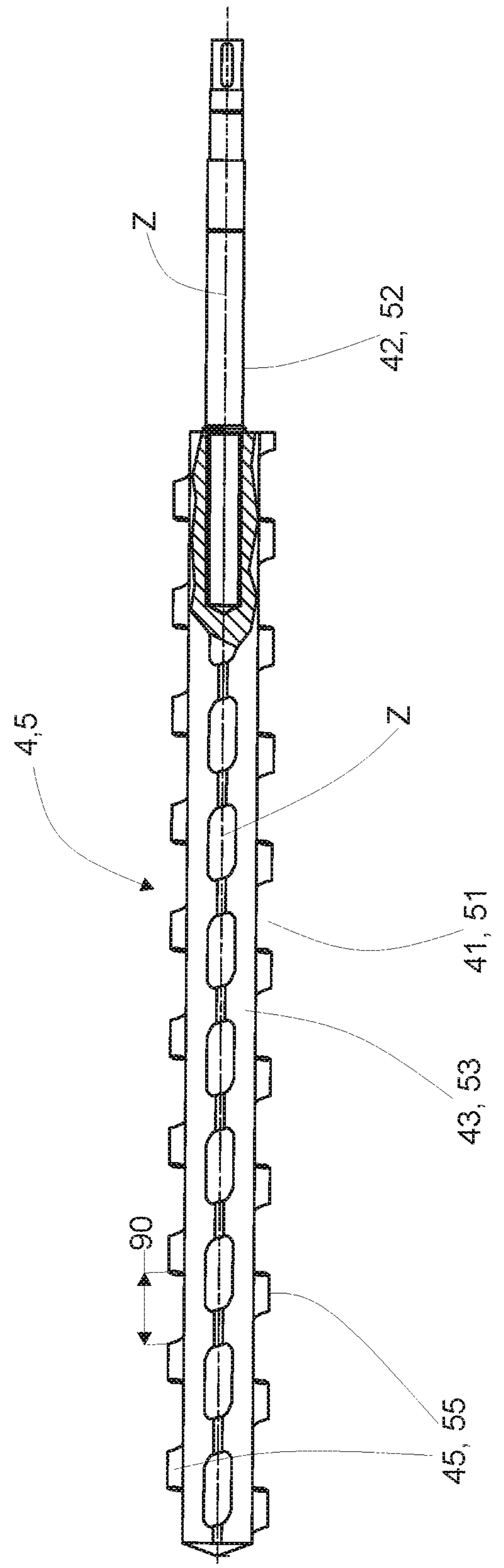
FIG. 3 illustrates a side view of a rotor.

As illustrated in FIG. 3, the agitator portions 41 and 51 of the first and second rotors 4, 5 include a central body 43, 53 that is elongated along the rotational axis Z. A plurality of spaced apart projections 45, 55 extend radially outwardly of the central body 43, 53 and also extend along the length of the exterior of the central body 43, 53.

The purpose of the projections 45, 55 is to create turbulence in the product 200 flowing through the conduit 1, thus contributing to the heating uniformity of the product 200.

The projections 45, 55 have a radial height H that is just less than the radius R of the inner tubular surface 25*a*, 35*a* of the electrical insulating member 25, 35 of the first and the second chambers 2, 3. As such, a clearance space S is provided for the passage of the product 200. The space S may range from between about 0.5-10 millimeters, and more specifically between about 0.5-5 millimeters.

This clearance space S is variable as a function of the density/viscosity of the product 200 to be treated In this regard, the space S must be of a size sufficient to allow the passage of the product 200 while avoiding the adhesion effect of the product 200 to the inner surface of the tube 25*a*, 35*a* if the space is too small. In this regard, if the product 200 adheres to the inner surface of the tube 25*a*, 35*a*, it can be burnt, since a larger amount of current passes through the product 200 that is adhered to the dielectric material of the tube 25*a*, 35*a*. Therefore, it is important that the size of the space S is selected so that the product 200 maintains its turbulence.

The maintenance of turbulence is important, especially for viscous products 200 that could spread and adhere to the tube 25*a*, 35*a*, thereby generating the passage of current flow on the inner surface of said tube 25*a*, 35*a* instead of inside the tube 25*a*, 35*a*, where the product 200 is to be heated.

The projections 45, 55 may have a constant radial height H along the entire length of the central body 43, 53. Alternatively, the radial height H of the projections can be varied along the length of the central body 43, 53.

The height H of the projections 45, 55 depends on the geometry or size of the ohmic pipe. The height of the projects is such that there is a clearance of between 0.5 to 1 mm between the tips of the projections and the inside wall of the ohmic pipe.

The projections 45, 55 of said first and second rotors 4, 5 may be distributed or spaced apart along the length of the central body 43, 53. The projections can be at a constant pitch as illustrated in FIG. 3, or alternatively the pitch of the projections can be variable along the length of the central body.

The projections 45, 55 of the first and second rotors 4, 5 define gaps 90 extending along the length of the central body. The gaps 90 may extend around the entire circumference of the central body.

Figure 4A:
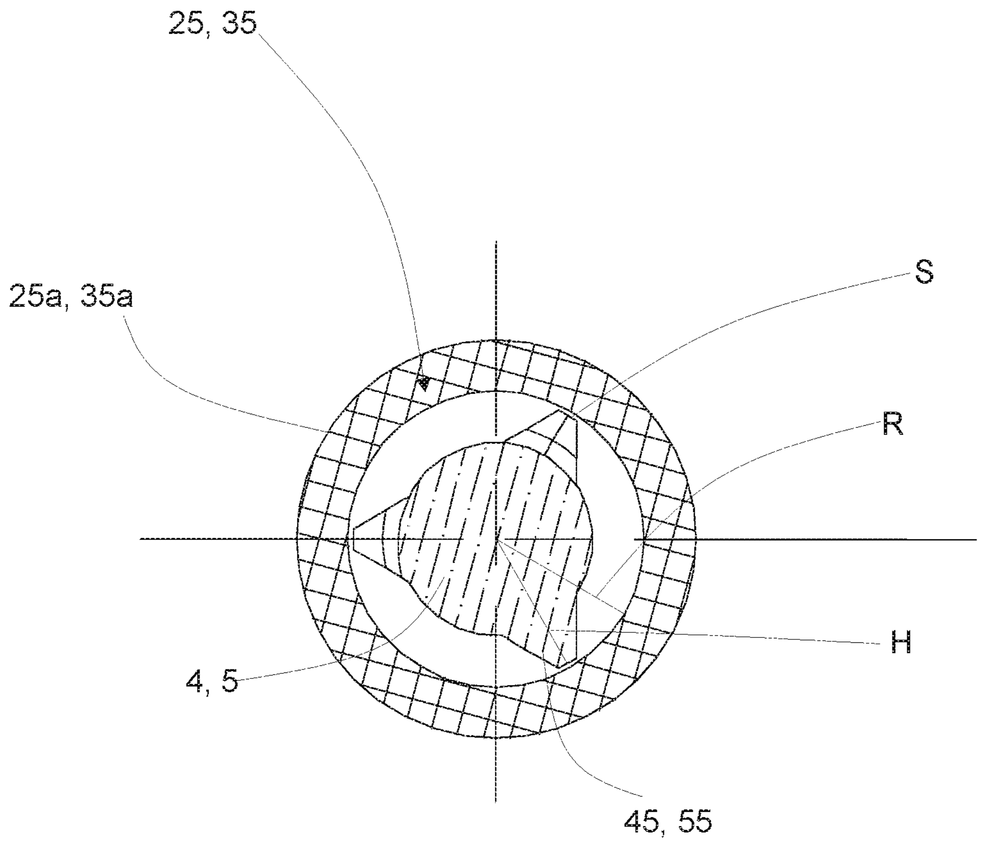
FIG. 4*a* illustrates a sectional view of a rotor at the electrical insulating member.
Figure 4B:
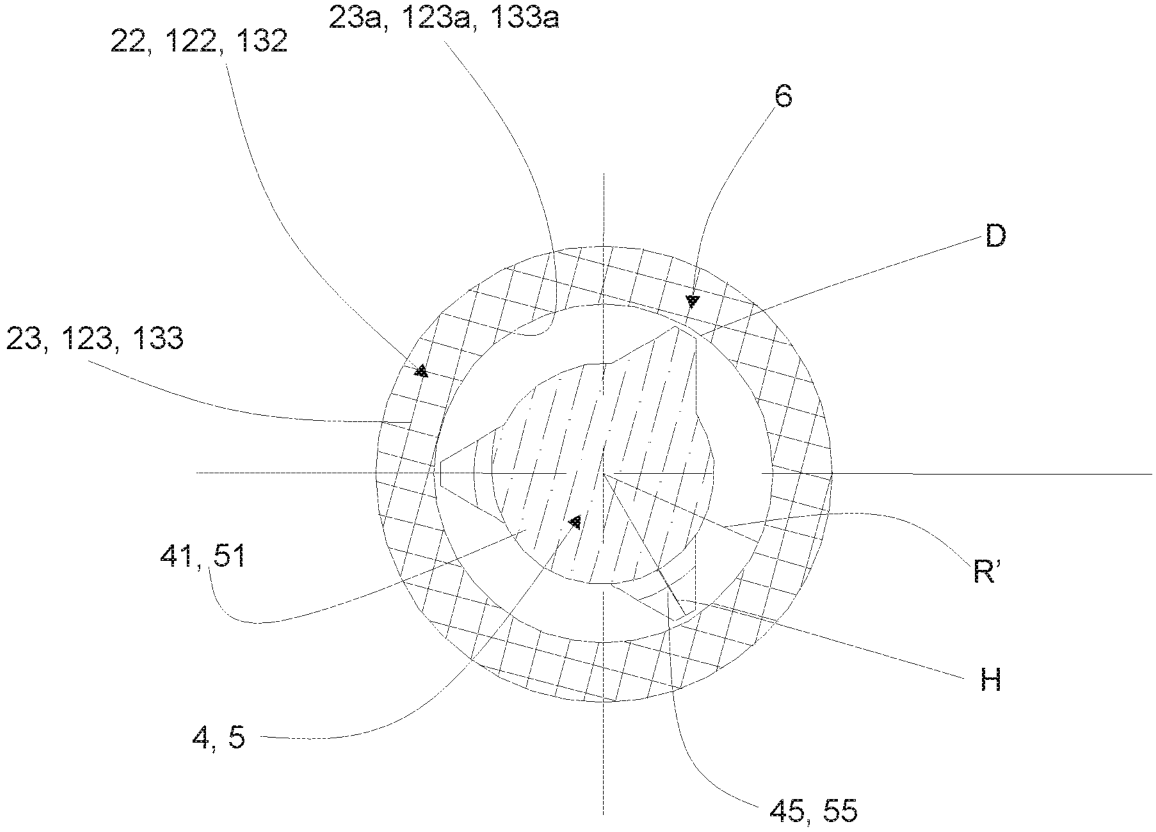
FIG. 4*b* illustrates a sectional view of a detail of the rotor at a positive electrode.

In addition, the projections 45, 55 of said first and second rotors 4, 5 can be radially distributed in rows about the circumference of the central body 43, 53 according to a preferably constant angle, as set forth in FIG. 4*a*, 4*b*.

In addition, the projections 45, 55 can be arranged to spiral around the outer circumference of the central body 43, 53.

As noted above, the projections 45, 55 are spaced apart from each other along the length of the central body 43, 53. This allows for passage of the product 200 through the conduit 1, even when the product is particularly viscous. This also reduces the adhesion of the product 200 to the interior surface of the electrical insulating member 25, 35.

It will be appreciated that by the forging construction of projections 45, 55 of the apparatus 100 relative of the central body 43, 53, a support system 6 is created to support the first and second rotors 4, 5 in the radial direction. The support system 6 is provided in at least the intermediate zone 13 of the conduit 1. As such, the first and second distal end portions 41, 51 are supported by the support system 6 rather than being cantilevered from the handling and support devices 8.

Therefore, both the first rotor 4 and the second rotor 5 are supported in the proximity of the first and second initial shaft portions 42, 52 by the handling and support devices 8, and are supported at the first and second agitator end portions 41, 51 by the support system 6.

According to present disclosure, the support system 6 is configured so that the first and second rotors 4, 5 are radially supported by the fluid product 200, which passes between the first and the second agitator end portions 41, 51 of said first and second rotors 4, 5 and the second electrode 22, 122, 132. In this regard, there are no additional components present or needed. Rather, the presence of the product 200, and in particular the fluid part thereof, flowing between the projections 45, 55 and inner tubular surface 25*a*, 35*a* of the electrical insulating member 25, 35 of the first and the second chambers 2 supports the rotor 4, 5.

The support system 6 is made possible by virtue of the configuration of the rotor 4, 5 and of the second electrode 22, 122, 132 as described herein. As illustrated in FIG. 4*b*, in the support system 6 the second electrode 22, 122, 132 is shaped as an annular body 23, 123, 133. In this regard, the annular body 23, 123, 133 may include an inner surface 23*a*, 123*a*, 133*a* that is in contact with the product 200.

The tips of the projections 45, 55 of the first rotor 4 and the second rotor 5 open extend to close proximity to the inner surfaces 23*a*, 123*a*, 133*a* as discussed below.

In the case, as shown in FIG. 2, where the apparatus 100 is made according to the constructive form, which provides for the pair of second electrodes 122, 132, one for the first chamber 2 and one for the second chamber 3, the inner surface 123*a* of said second electrode 122 extends along the axis Z so as to be facing one or more projections 45 of the first rotor 4, while the inner surface 133*a* of said second electrode 132 extends along the axis Z so as to be facing one or more projections 55 of the second rotor 5.

In the case, as shown in FIG. 1, where the apparatus 100 is made according to the constructive form, which provides for a second electrode 22 which is unique for the first chamber 2 and for the second chamber 3, the second electrode 22 extends along the axis Z so that its inner surface 23*a* faces one or more projections 45 of the first rotor 4 and one or more projections 55 of the second rotor 5.

Therefore, in this second configuration for FIG. 1, the second electrode 22 may have a longer length in the direction Z than that of the electrodes 122, 132 in the configuration of FIG. 2 where the second electrodes 122, 132 are distinct.

In order to achieve the desired support effect of the rotor 4, 5 by the product 200, a distance D preferably ranging between 0.1-0.3 mm, in which the fluid product 200 passes, may be provided for between the projections 45, 55 and the inner surface 23*a*, 123*a*, 133*a* of the annular body 23, 123, 133. This reduced size of the passage causes the fluid product 200 that flows through this distance D to create a support action for the first and second rotors 4,5 during the rotation of the first and second rotors 4, 5.

It is pointed out that the use of the product 200 to radially support the first and second rotors 4, 5 occurs at the second electrode 22, 122, 132 and not at the electrical insulating member 25, 35. In this regard, at the inner surface 23*a*, 123*a*, 133*a* of the annular body 23, 123, 133 of the second electrode 22, 122, 132 there is no passage of current, and the product 200 does not heat up and acts as a fluid buffer.

On the contrary, as described above, the current passes through the product 200, which may adhere to the electrical insulating member 25, 35, and can be burnt.

The space S between said projections 45, 55 and the inner surface of the tube 25*a*, 35*a* of the electrical insulating member 25, 35 is larger than the distance D between said projections 45, 55 and the inner surface 23*a*, 123*a*, 133*a* of the annular body 23, 123, 133. As such, the annular body 23, 123, 133 has an inner radius R' that is less than the radius R of the inner surface of the tube 25*a*, 35*a* so as to make the distance D less than the space S.

In sum, the first and the second agitator end portions 41, 51 of the first and second rotors 4, 5 are not cantilevered, but supported by the support system 6, which is a simple and unexpensive system. This makes it possible to drive the first and second rotors 4, 5 at higher speeds compared to a cantilevered rotor.

The wear of the rotor 4, 5 is also reduced, as it does not risk creeping on the inner surface of the tube 25*a*, 35*a*.

Therefore, by virtue of the presence of two rotors 4, 5 instead of only one, and due to the fact that the first and second agitator end portions 41, 51 are supported, an apparatus 100 with high managing flexibility is achieved, which allows the processing of a wide range of products 200.

In addition, a further advantage of apparatus is that the first and second rotors 4, 5 can be driven by motors with reduced torque compared to apparatuses with a single rotor.

Figure 5:
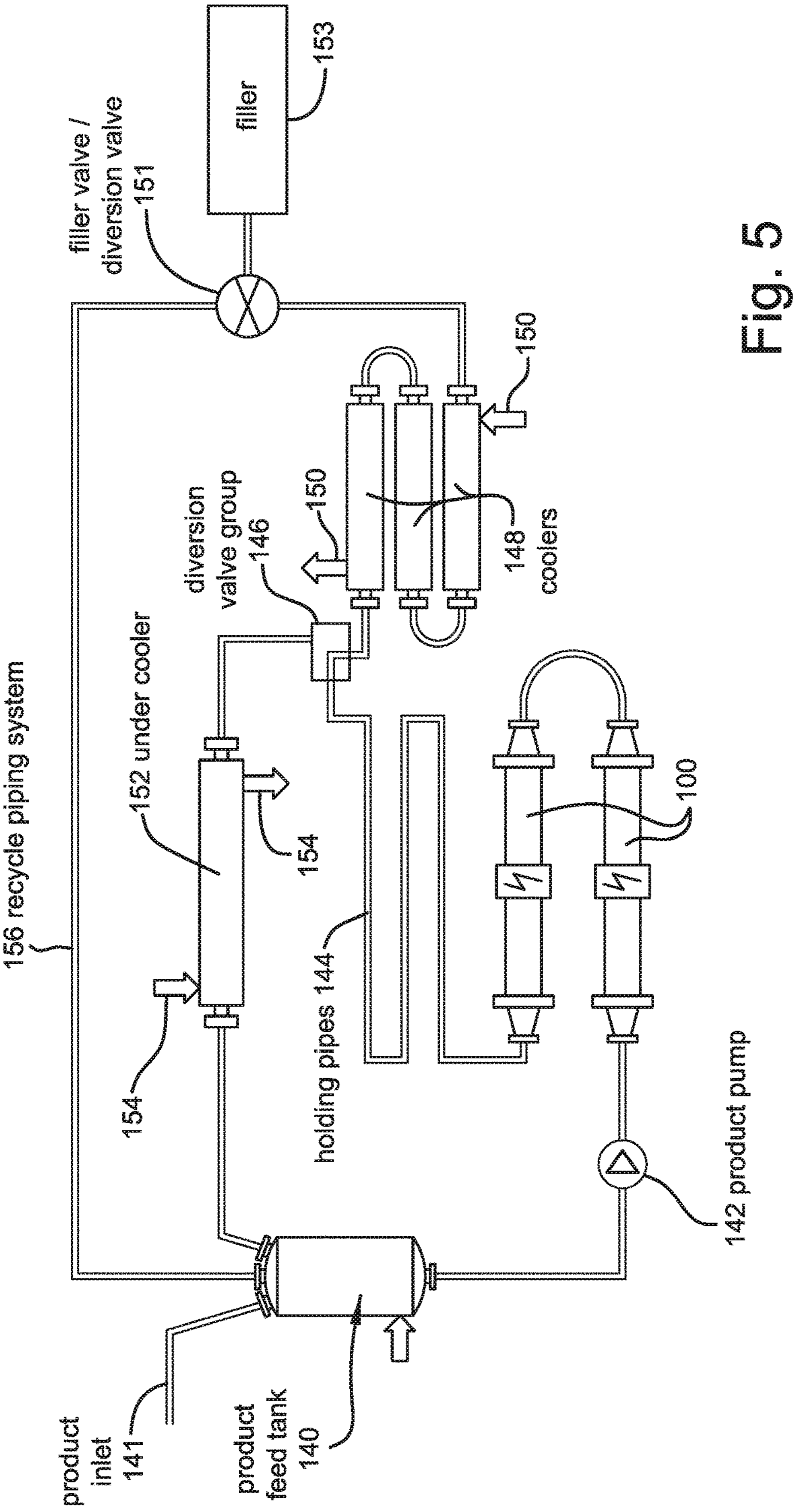
FIG. 5 illustrates a diagram of a plant comprising an apparatus according to the present disclosure.

Referring to FIG. 5, the product 200 is stored in a product feed tank 140. The product 200 is received into the feed tank through inlet line 141. A pump 142 transfers the product 200 to the ohmic heater 100, then to holding tubes 144. Diversion valves 146 allow only the properly treated product 200 to flow into coolers 148. Arrows 150 show the flow of a cooling medium to and from the coolers.

From the coolers 148, the product is directed by valve 151 to a filler system 153.

The product that has not been correctly pasteurized is recirculated by the valves 146 back to the product feed tank. The under cooler 152 is needed to bring down the temperature of the recirculated product 200. Arrows 154 show the flow of a cooling medium to and from the under cooler 148.

A recycling piping system 156 is needed to recirculate the product when the filler system is not able to fill containers with the processed product 200, or during cleaning and sterilization steps of the filler system. In this situation, valve 151 routes the processed product back to the infeed tank.

While illustrative embodiments have been illustrated and described, it will be appreciated that various changes can be made therein without departing from the spirit and scope of the invention.

The embodiments of the invention in which an exclusive property or privilege is claimed are defined as follows:

1. An apparatus for the continuous thermal treatment of a fluid product by resistive heating, comprising:

a conduit defining a longitudinal flow path for the product to be treated extending between an inlet and an outlet, the conduit comprising at least a first and a second heating chamber that are disposed longitudinally along an axis and arranged in sequence, each heating chamber comprising a first electrode and a second electrode, separated by an electrical insulating member and defining a central passage through which the fluid product flows, wherein the first electrode is located near the inlet or the outlet of the conduit, and the second electrode is located in an intermediate zone of the conduit;

a first and a second rotor extending into the first chamber and the second chamber, respectively, the first and second rotors have a proximal end portion that is powered for rotation about a longitudinal axis of the first and second rotors and a distal end portion extending into the central passages of the second electrodes; and a support system configured to support in the radial direction of the distal end portions of the first and second rotors, within the second electrodes, said support system comprising the fluid product flowing between the distal end portions of the first and second rotors and the second electrodes.

2. The apparatus according to claim 1, wherein said first and second rotors comprise a central elongated body extending along the longitudinal axis and a plurality of projections extending radially from the central body.

3. The apparatus according to claim 2, wherein the second electrode is shaped as an annular body having an inner surface which the projections face.

4. The apparatus according to claim 3, wherein the distance separating the projections and the inner surface of the annular body is from between 0.1-0.3 millimeters, through which the fluid product passes.

5. The apparatus according to claim 2, wherein:

the electrical insulating members comprise cylindrical interiors; and the projections have a radial height extending from the rotor elongated body that is less than the inner radius of the electrical insulating members so as to leave a space for the passage of the product.

6. The apparatus of claim 5, wherein space between the projections and the inner radius of the electrical insulating members is from between 0.5-10 millimeters.

7. The apparatus of claim 5, wherein space between the projections and the inner radius of the electrical insulating members is from between 0.5-5 millimeters.

8. The apparatus according to claim 1, wherein the first electrode is a negative electrode.

9. The apparatus according to claim 1, wherein the second electrode is a positive electrode.

10. The apparatus according to claim 9, wherein the second electrode is connected to a square-wave current power source.

11. The apparatus according to claim 1, wherein the first electrode and the second electrode are subjected to an electric current of a potential difference of at least 700V with a frequency of at least 16 kHz.

12. The apparatus according to claim 11, wherein the voltage of the electric current applied to the pair of electrodes ranges between 700V and 5100V, and the frequency of the electric current ranges between 16 and 50 kHz.

13. The apparatus according to claim 1, wherein the first and second rotors are coupled to handling and support devices adapted to rotate the first and second rotors independently of one another.

14. The apparatus according to claim 13, wherein the handling and support devices comprise a first motor coupled to a proximal portion of the first rotor, and a second motor coupled to a proximal portion of the second rotor.

15. The apparatus according to claim 2, wherein the projections of the first and second rotors are spaced apart along the length of the central body.

16. The apparatus according to claim 15, wherein the projections of the first and second rotors define gaps extending along the length of the central body, the gaps extending around the entire circumference of the central body.

17. The apparatus according to claim 1, wherein the second electrode is common to the first and the second chambers, wherein, with respect to the direction of flow of the product, the first chamber ends with the second electrode and the second chamber starts with the second electrode.

18. The apparatus according claim 1, wherein the second electrode of the first chamber is distinct from the second electrode of the second chamber, and one or more connecting members are interposed between the two second electrodes.

19. The apparatus according to claim 1, wherein the first and second rotors are composed of dielectric material.

* * * * *